US008693220B2

(12) United States Patent
Klodowski et al.

(10) Patent No.: US 8,693,220 B2
(45) Date of Patent: Apr. 8, 2014

(54) SYSTEM FOR IMPROVED WIND TURBINE GENERATOR PERFORMANCE

(75) Inventors: Anthony Michael Klodowski, Hardy, VA (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 13/281,879

(22) Filed: Oct. 26, 2011

(65) Prior Publication Data

US 2013/0107586 A1    May 2, 2013

(51) Int. Cl.
*H02M 5/45* (2006.01)
*H02H 7/122* (2006.01)

(52) U.S. Cl.
USPC .......................................... 363/37; 363/56.01

(58) Field of Classification Search
USPC ........................... 363/37, 55, 56.1; 290/44, 55
See application file for complete search history.

(56) References Cited

U.S. PATENT DOCUMENTS

| | | | | |
|---|---|---|---|---|
| 3,963,978 A | * | 6/1976 | Kelley et al. | 323/210 |
| 4,156,186 A | * | 5/1979 | Wolfinger | 324/108 |
| 5,083,039 A | * | 1/1992 | Richardson et al. | 290/44 |
| 5,652,485 A | * | 7/1997 | Spiegel et al. | 318/147 |
| 5,798,632 A | * | 8/1998 | Muljadi | 322/29 |
| 7,239,036 B2 | | 7/2007 | D'Atre et al. | |
| 7,944,068 B2 | | 5/2011 | Wagoner et al. | |
| 2009/0096211 A1 | * | 4/2009 | Stiesdal | 290/44 |
| 2009/0147549 A1 | * | 6/2009 | Jones et al. | 363/37 |
| 2011/0018281 A1 | * | 1/2011 | Tan et al. | 290/55 |
| 2011/0134669 A1 | * | 6/2011 | Yuzurihara et al. | 363/89 |
| 2011/0140438 A1 | | 6/2011 | Delmerico et al. | |
| 2012/0299305 A1 | * | 11/2012 | Brogan et al. | 290/55 |
| 2013/0010505 A1 | * | 1/2013 | Bo et al. | 363/37 |

* cited by examiner

*Primary Examiner* — Adolf Berhane
*Assistant Examiner* — Emily P Pham
(74) *Attorney, Agent, or Firm* — Hoffman Warnick LLC; Ernest G. Cusick

(57) ABSTRACT

A system for improving wind turbine generator performance is disclosed. In one aspect a rotary power generation system is provided, including: a rotary power generator for generating variable-frequency alternating currents; a negative sequence current regulator that determines and uses frequency-dependent D-axis and Q-axis negative sequence gains based on an electrical frequency of the rotary power generator; and a system for controlling voltage components for balancing the variable-frequency alternating currents generated by the rotary power generator based on the selected D-axis and Q-axis negative sequence gains.

13 Claims, 5 Drawing Sheets

SYSTEM FOR IMPROVED WIND TURBINE GENERATOR PERFORMANCE

BACKGROUND

The present invention relates generally to power conversion systems. More particularly, the invention relates to a power conversion system used in a rotary power generation system for converting a variable-frequency alternating current produced by a variable-speed rotary power generator into an alternating current with controlled amplitude or frequency for feeding an electric grid.

A rotary power generation system comprises a rotary power generator for generating an alternating current with a variable frequency by rotation of a generator rotor and a power conversion system for converting the variable-frequency alternating current into an alternating current with controlled amplitude or frequency to be supplied to an electric grid. One example of such a rotary power generation system is a variable-speed wind turbine power generation system.

Variable-speed wind turbine power generation systems are one type of renewable energy-based power unit that competes with traditional forms of electric power generation. As a result, variable-speed wind turbine power generation systems depend on cost effective, reliable as well as safe means to capture wind energy and convert it to electrical energy that is suitable for delivery miles away. In operation, variable-speed wind turbine power generation systems include a multiple of rotating blades connected to a rotor shaft that are turned by the wind. The rotation of the blades by the wind spins the rotor shaft to generate a rotational torque or force that drives one or more generators to convert mechanical energy to electrical energy. The rotor shaft and generator are mounted within a housing or nacelle that is positioned on top of a truss or tubular tower. The electrical energy generated in the nacelle is distributed down through the tower to a utility grid via a transformer.

Variable-speed wind turbine power generation systems include generators with rotation speeds that vary with wind speed and which generate an alternating current with a variable frequency. Variable speed wind turbine generators can provide more energy over a range of wind speeds as compared with wind turbine generators requiring a constant speed of operation.

Power conversion systems for variable-speed wind turbine power generation systems typically include a generator-side electronic power converter for converting the variable-frequency alternating current into a direct current at a DC link. A line (or grid) side electronic power converter is also provided for converting the direct current at the DC link into an alternating current with controlled amplitude or frequency for feeding the electric grid. The electronic power converters may be made up of a single full size converter or multiple smaller converters operated in parallel, each of which is referred to as a thread. It is desirable to transmit as much of the wind power to the grid as possible.

During the generation of power in a variable-speed wind turbine power generation system, the generator currents or thread currents can become imbalanced by electrical imbalances in the converter, generator or cables. Such imbalances in current can cause power reduction of the generator to occur which leads to inefficient generation of power by the wind turbine.

BRIEF SUMMARY OF THE INVENTION

Embodiments disclosed herein include a rotary power generation system, comprising: a rotary power generator for generating variable-frequency alternating currents; a negative sequence current regulator that determines and uses frequency-dependent negative sequence gains based on an electrical frequency of the rotary power generator; and a system for controlling voltage components for balancing the variable-frequency alternating currents generated by the rotary power generator based on the negative sequence gains.

Embodiments disclosed herein also include a variable-speed wind power generation system, comprising: a variable-speed wind turbine generator for generating three-phase variable-frequency alternating currents; a negative sequence current regulator that determines and uses frequency-dependent negative sequence gains based on an electrical frequency of the variable-speed wind turbine generator; and a system for controlling voltage components for balancing the three-phase variable-frequency alternating currents generated by the variable-speed wind turbine generator based on the negative sequence gains.

Embodiments disclosed herein also include a method for balancing generator currents, comprising: obtaining an electrical frequency of a rotary power generator; selecting determining negative sequence gains from a set of frequency-dependent negative sequence gains based on the obtained electrical frequency of the rotary power generator; generating negative sequence voltage signals based on the selected determined negative sequence gains; and balancing variable-frequency alternating currents generated by the rotary power generator using the generated negative sequence voltage signals.

The above described and other features are exemplified by the following detailed description.

BRIEF DESCRIPTION OF THE DRAWINGS

These and other features of this invention will be more readily understood from the following detailed description of the various aspects of the invention taken in conjunction with the accompanying drawings that depict various embodiments of the invention.

DETAILED DESCRIPTION

Embodiments disclosed herein relate to a power conversion system used in a rotary power generation system for converting a variable-frequency alternating current produced by a variable-speed rotary power generator into an alternating current with controlled amplitude or frequency for feeding an electric grid.

Power conversion systems for variable-speed wind turbine power generation systems typically include a generator-side electronic power converter for converting the variable-frequency alternating current into a direct current at a DC link. A line (or grid) side electronic power converter is also provided for converting the direct current at the DC link into an alternating current with controlled amplitude or frequency for feeding the electric grid. The electronic power converters may be made up of a single full size converter or multiple smaller converters operated in parallel, each of which is referred to as a thread. It is desirable to transmit as much of the wind power to the grid as possible.

Described herein is a negative sequence current regulator that is used to balance thread currents to maximize the wind power transferred to the electric grid. The negative sequence current regulator is described below with regard to a single converter, but is generally applied to a multi-threaded converter. For example, a multi-threaded converter can include four (4) threads, each of which can include the negative sequence current regulator of the present invention embedded therein. The result is that the thread currents are balanced and so is the generator current. This is viable for any number of threads.

Figure 1:
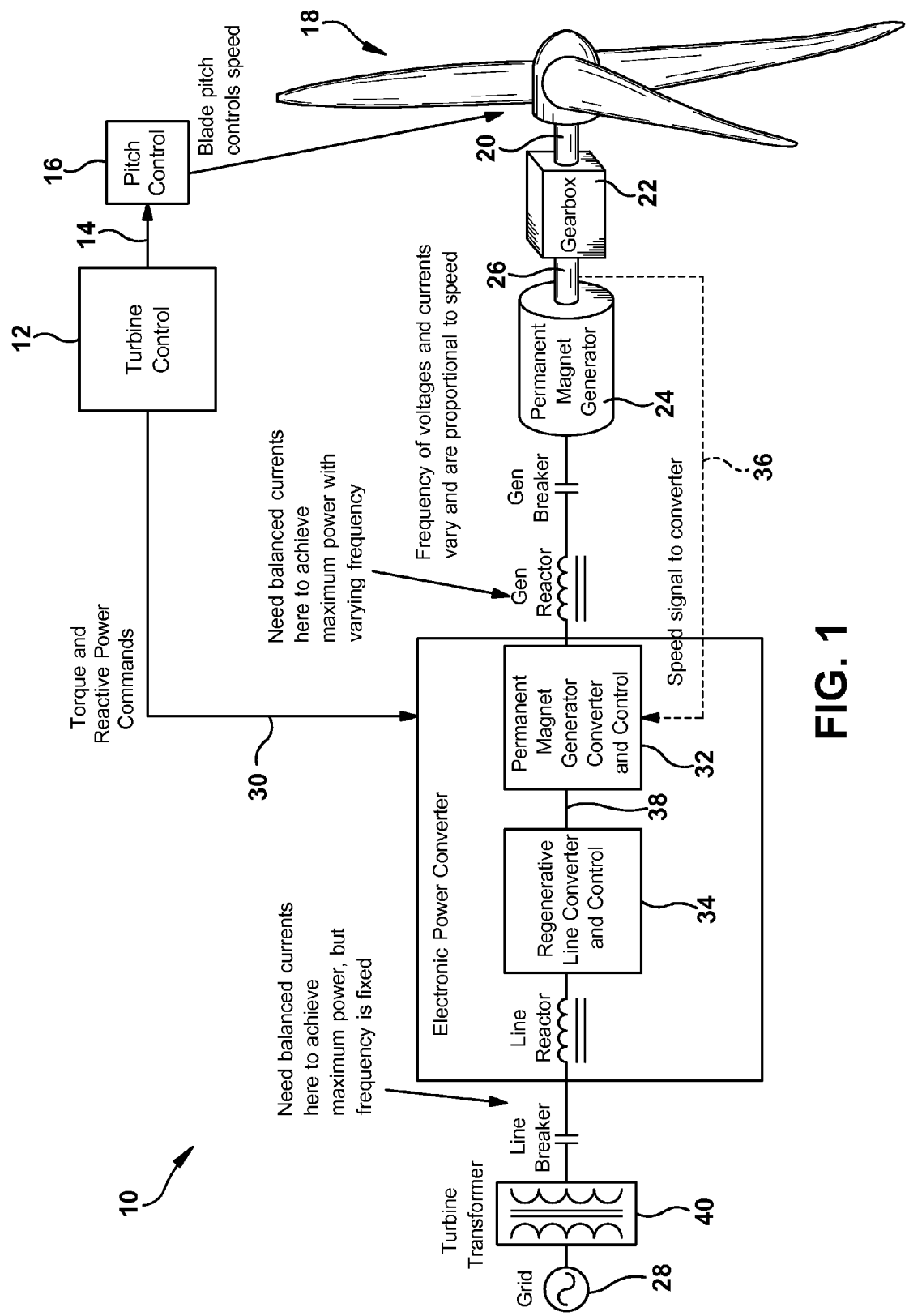
FIG. 1 is a block diagram of a rotary power generation system coupled to an electric grid, according to an embodiment.

Reference is first made to a rotary power generation system as illustrated in FIG. 1. In this embodiment, the rotary power generation system comprises a variable-speed wind turbine power generation system 10 ("wind turbine system 10"). Although described herein with regard to a variable-speed wind turbine power generation system, embodiments of the invention are applicable to other rotary power generation systems having a rotary power generator that is operated at a variable speed. Examples of other types of rotary power generation systems may include, for example, gas turbines, micro-turbines, and marine hydro kinetic devices.

When wind conditions are sufficient, a turbine control 12 communicates control signals to various sub-control systems in the wind turbine system 10. One of the control signals is a pitch control signal 14 that is provided to a pitch control 16 to set the pitch of a set of turbine blades 18 in order to regulate the rotational speed of a first shaft 20 to a gearbox 22. The gearbox 22 is coupled to a permanent magnet generator 24 by a generator shaft 26.

The turbine control 12 regulates the power provided to the electric grid 28 via the pitch control signal 14, torque command 30, permanent magnet generator converter and control 32 ("generator converter" 32), and regenerative line converter and control 34 ("line converter" 34). The real power provided to the electric grid 28 is controlled by the generator converter 32 and line converter 34 (and associated controls) and is determined to be the product of the torque command 30 and an angular speed 36 of the generator shaft 26.

The line converter 34 generates a set of three phase electrical sinusoidal voltages in a manner to induce currents that are necessary for the line converter 34 to produce the active power provided by the generator converter 32 and the reactive power commanded by the turbine control 12. The line converter 34 manages the voltage at the dc link 38 so that nearly all of the power generated into the dc link 38 by the permanent magnet generator 24 and the generator converter 32 is exported to the electric grid 28.

The permanent magnet generator 24 develops a voltage on its terminals that is a function of the rotational speed of the generator shaft 26. The generator converter 32 generates a set of three phase electrical sinusoidal voltages at its terminals in a manner to induce currents that are necessary for the generator converter 32 to follow the torque command 30 given by the turbine control 12 and to provide for losses in the system. In order to perform proper control, the generator convertor 32 either calculates or measures the angular speed 36 of the permanent magnet generator 24 (e.g., the angular speed 36 of the generator shaft 26). Typically, the angular speed 36 of the permanent magnet generator 24 is measured and provided to the generator convertor 32 as depicted in FIG. 1.

The flow of the three phase currents from the permanent magnet generator 24 into the generator convertor 32 must be managed in such a way as not to exceed the ratings of the generator converter 32, the permanent magnet generator 24, and the conductors that connect the generator converter 32 and the permanent magnet generator 24. Generally, this requires that the maximum of the three phase currents does not exceed the capacity of those devices. The same restrictions apply to the line converter 34, turbine transformer 40, and connecting cabling.

The wind turbine system 10 can produce maximum power when all of the three phase currents are at the maximum allowed value and are of the same magnitude. If the three phase currents are imbalanced, the maximum current of the three phases must still not exceed the allowed capacity of the system components. Thus, it is desirable to achieve balance of the three phase currents between the generator converter 32 and the permanent magnet generator 24 as well as the three phase currents between the line converter 34 and the turbine transformer 40.

Since the frequency of the electric grid 28 voltage is somewhat fixed, it is relatively easy to balance the three phase currents between the line converter 34 and the turbine transformer 40. However, the control complexity needed to balance currents between the permanent magnet generator 24 and the generator converter 32 is much more difficult because of the variable frequencies of the three phase currents flowing between the permanent magnet generator 24 and the generator converter 32.

Figure 2:
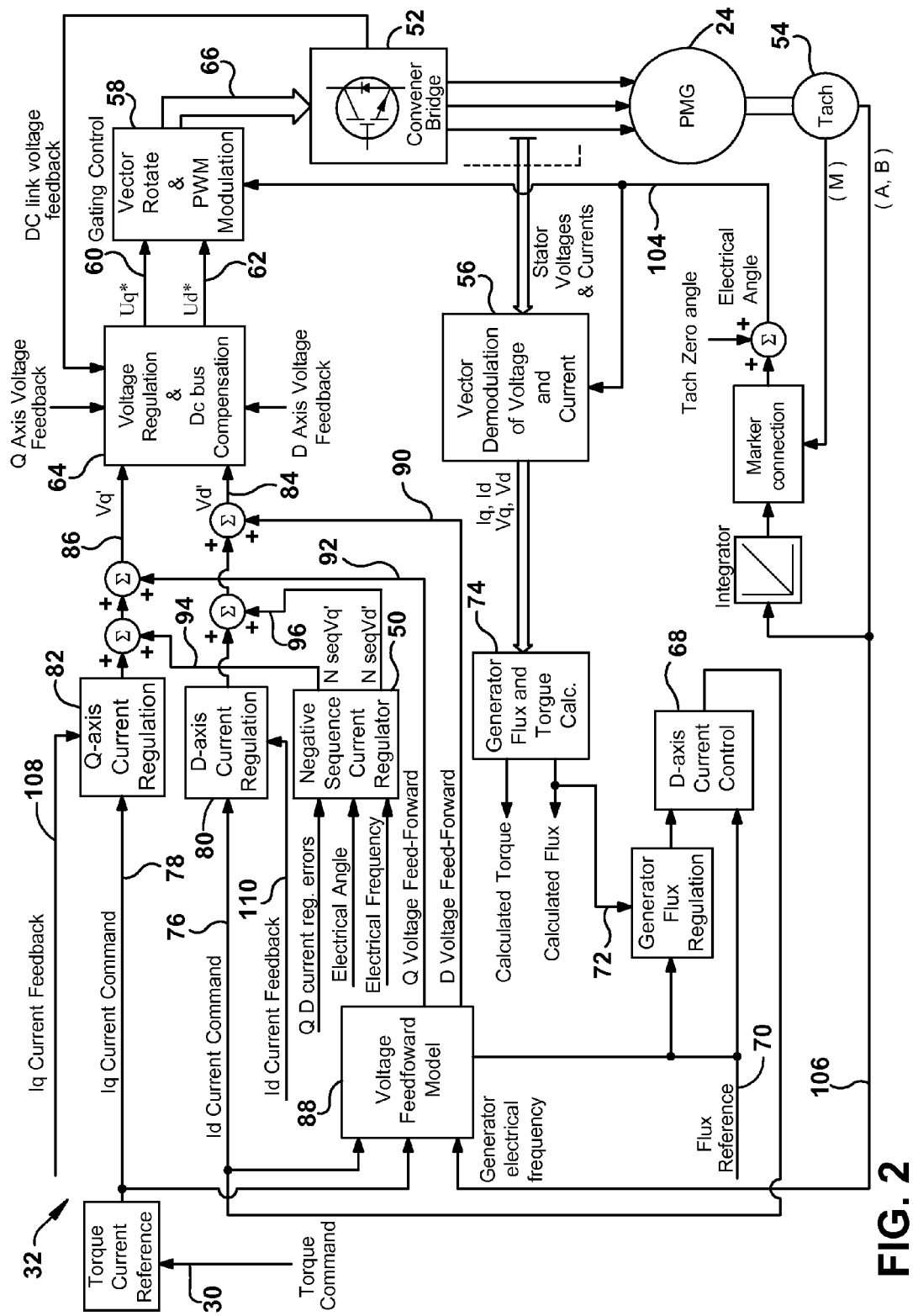
FIG. 2 is a diagrammatic representation of an exemplary permanent magnet generator controller employed in the rotary power generation system of FIG. 1, according to an embodiment.

FIG. 2 is a more detailed view of a generator converter 32 in accordance with an embodiment. Many of components of the generator converter 32 operate in a known manner and will not be described in detail. In particular, the components of the generator converter 32, with the exception of the operation of the negative sequence current regulator 50, are within the purview of one skilled in the art and will not be described in detail.

Shown on the right side of FIG. 2 are a converter bridge 52, the permanent magnet generator 24, and a system 54 for measuring the angular speed 36 of the permanent magnet generator 24. These components are not part of the generator converter 32.

A vector demodulator 56 samples the voltages and currents from the permanent magnet generator 24, and demodulates the sampled voltages and currents into signals Iq, Id, Vq, and Vd. A vector rotate and PWM (pulse-width modulation) modulation component 58 receives Uq* 60 and Ud* 62 modulation commands from a voltage regulation and DC bus compensation component 64, rotates the Uq* 60 and Ud* 62 modulation commands at the frequency and electrical angle 104 of the generator voltages, and produces gating 66 signals that are transmitted to the gating devices of the converter bridge 52. The remaining components depicted in FIG. 2 are used to generate the Uq* 60 and Ud* 62 modulation commands in such a way as to follow the torque command 30 from the torque control 12.

A D-axis current control 68 compares a flux reference 70 to a generator flux 72 calculated by a generator flux and torque calculation component 74 from the Iq, Id, Vq, and Vd signals output by the vector demodulator 56. The D-axis current control 68 outputs a D-axis current command 76. A Q-axis current command 78 is generated from the torque command 30. The D-axis current command 76 and the Q-axis current command 78 are provided to a D-axis current regulator 80 and a Q-axis current regulator 82, respectively.

The signals output by the D-axis current regulator 80 and the Q-axis current regulator 82 are compensated by two other signal sets to provide Vd* 84 and Vq* 86 voltage signals to the voltage regulation and DC bus compensation component 64. One set, generated by a voltage feed-forward component 88, includes a D-axis feed-forward voltage 90 and a Q-axis feed-forward voltage 92, which approximate the net voltage needed and lessen the work of the D-axis current regulator 80 and the Q-axis current regulator 82. The other set, generated by the negative sequence current regulator 50, includes a NseqVq* 94 signal and a NseqVd* 96 signal, which are the focus of the present disclosure.

The NseqVq* 94 and NseqVd* 96 signals are determined by the negative sequence current regulator 50 in such a way that their summation into the Vd* 84 and Vq* 86 voltage signals trims the Vd* 84 and Vq* 86 voltage signals to achieve balanced currents between the generator converter 32 and the permanent magnet generator 24. As depicted in greater detail in FIG. 3, the inputs to the negative sequence current regulator 50 include a Q-axis current regulator error 100, a D-axis current regulator error 102, a generator electrical angle 104, and a generator electrical frequency 106. The Q-axis current regulator error 100 is determined by the Q-axis current regulator 82 and is based on the difference between the Q-axis current command 78 and a Q-axis current feedback signal 108 (FIG. 2). Similarly, the D-axis current regulator error 102 is determined by the D-axis current regulator 80 and is based on the difference between the D-axis current command 76 and a D-axis current feedback signal 110 (FIG. 2).

Figure 3:
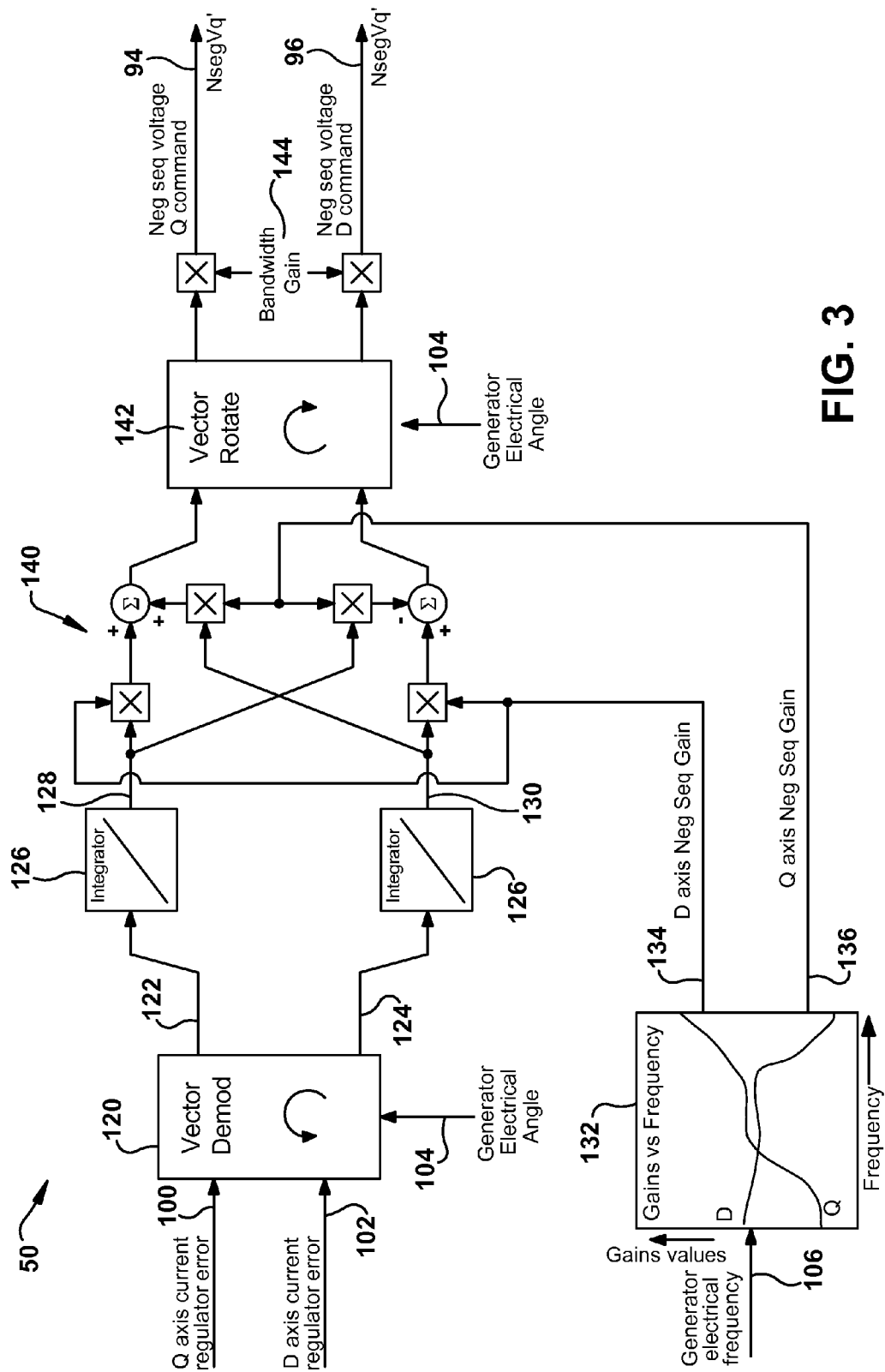
FIG. 3 is a diagrammatic representation of an exemplary generator negative sequence regulator employed in the permanent magnet generator controller of FIG. 2, according to an embodiment.

Referring to FIG. 3, a vector demodulator 120 demodulates the Q-axis current regulator error 100 and the D-axis current regulator error 102 using the generator electrical angle 104 into an Iq error signal 122 and an Id error signal 124, respectively. The Iq error signal 122 and the Id error signal 124 are then passed through respective integrators 126 to generate signals 128, 130.

In accordance with an embodiment, a frequency-dependent set 132 of D-axis and Q-axis negative sequence gains 134, 136 are applied to the signals 128, 130 and then rotated by vector rotator 142 using the generator electrical angle 104 to generate the NseqVq* 94 and NseqVd* 96 signals. When using NseqVq* 94 and NseqVd* 96 signals generated in this manner, the currents in the three phases of the permanent magnet generator 24 (FIG. 1) are balanced across the entire frequency range of operation of the permanent magnet generator 24 (FIG. 1), thereby increasing the operational efficiency and yield of the wind turbine system 10 (FIG. 1).

In an embodiment, referring collectively to FIGS. 1-3, it was determined that in a wind turbine system 10 in which the generator electrical frequency 106 of the voltages vary over a wide range with time, the D-axis and Q-axis negative sequence gains 134, 136 necessary for proper and stable performance of the negative sequence current regulator 50 vary according to the generator electrical frequency 106. To this extent, for a given wind turbine system 10, a stable frequency-dependent set 132 of D-axis and Q-axis negative sequence gains 134, 136 across the operational frequency range of the wind turbine system 10 was developed and dynamically applied (e.g., via a look-up table or calculation) as a function of generator electrical frequency 106. Depending on the details of the electrical system design and tune-up of the regulating structure detailed in FIG. 2 each different wind turbine system 10 could have different operational characteristics, a different frequency-dependent set 132 of D-axis and Q-axis negative sequence gains 134, 136 may be required for each wind turbine system 10.

Figure 4:
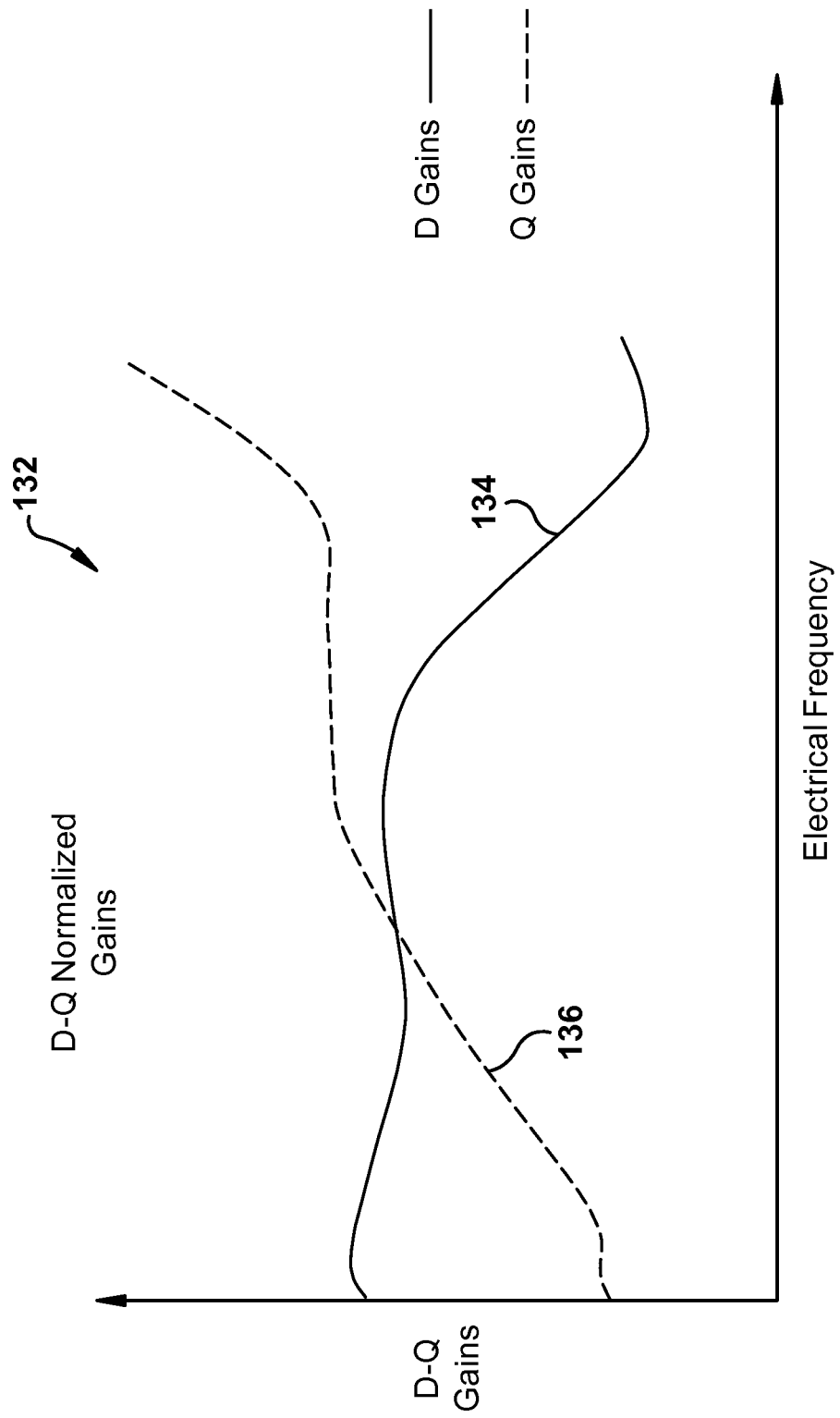
FIG. 4 depicts a chart of D-axis and Q-axis negative sequence gains for a plurality of different frequencies, according to an embodiment.

In an embodiment, an exemplary frequency-dependent set 132 of D-axis and Q-axis negative sequence gains 134, 136 was determined by analyzing the performance (e.g., step response) of the negative sequence current regulator 50 and wind turbine system 10 for a range of rotational speeds (e.g. 300 rpm to 535 rpm to 2000 rpm) as the D-axis and Q-axis negative sequence gains in the negative sequence current regulator 50 were varied. The D-axis and Q-axis negative sequence gains thus determined were then normalized to achieve a step response that had the same time response across the frequency range, thereby providing the D-axis and Q-axis negative sequence gains 134, 136. An illustrative frequency-dependent set 132 of D-axis and Q-axis negative sequence gains 134, 136, which shows the wide variation of the D-axis and Q-axis negative sequence gains 134, 136 necessary for proper and stable performance of the negative sequence current regulator 50 at different generator electrical frequencies 106, is depicted in FIG. 4.

Referring again to FIG. 3, the D-axis and Q-axis negative sequence gains 134, 136 are applied to the signals 128, 130 by a cross-coupled multiplier/adder circuit 140. Thereafter, the outputs of the cross-coupled multiplier/adder circuit 140 undergo a vector rotation 142 based on the generator electrical angle 104 and are then multiplied by a bandwidth gain 144 to generate the NseqVq* 94 and NseqVd* 96 signals. The bandwidth gain 144 is a fixed normalizing gain for the current regulating structure. It is practically redundant to the D, Q gains and is an independent way of adjusting the amplitude of the correction. The D, Q gains are set to control the relative amplitudes of the components (which determine both the amplitude and phase shift of the correcting signal) and the amplitude is further adjusted by the bandwidth gain.

Figure 5:
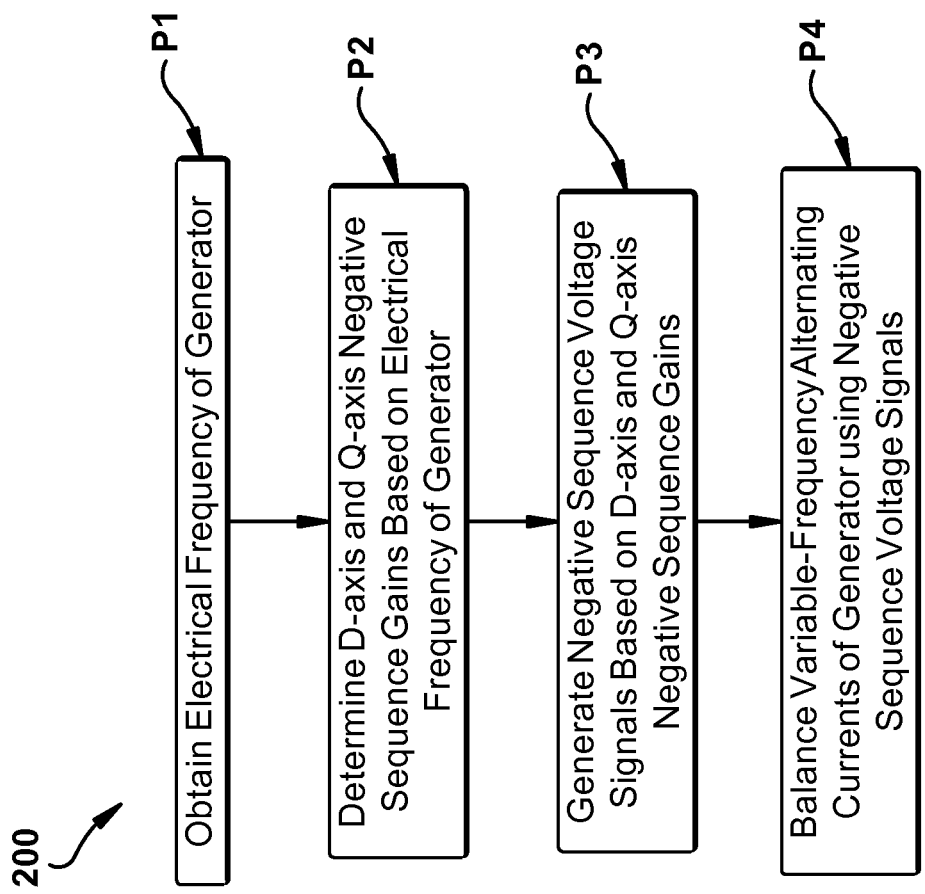
FIG. 5 is a flow diagram of a process for balancing generator currents, according to an embodiment.

FIG. 5 depicts a flow diagram 200 of a process for balancing generator currents, according to an embodiment. At P1, the electrical frequency of the permanent magnet generator is obtained. At P2, D-axis and Q-axis negative sequence gains are selected determined from a frequency-dependent set of D-axis and Q-axis negative sequence gains based on the obtained electrical frequency of the permanent magnet generator. At P3, negative sequence voltage signals are generated based on the selected determined D-axis and Q-axis negative sequence gains. At P4, the variable-frequency alternating currents generated by the permanent magnet generator are balanced using the generated negative sequence voltage signals, thereby maximizing the wind power transferred to the electric grid.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotary power generation system, comprising:
a rotary power generator for generating variable-frequency alternating currents;
a negative sequence current regulator that determines and uses frequency dependent negative sequence gains based on an electrical frequency of the rotary power generator,
wherein the negative sequence current regulator is further configured to:
obtain the electrical frequency of the rotary power generator;
determine the frequency dependent negative sequence gains from the set of frequency dependent negative sequence gains based on the obtained electrical frequency of the rotary power generator; and
generate negative sequence voltage signals based on the determined frequency dependent negative sequence gains; and
a system for controlling voltage components for balancing the variable frequency alternating currents generated by the rotary power generator based on the frequency dependent negative sequence gains,
wherein the system for controlling voltage components is further configured to balance the variable-frequency alternating currents of the rotary power generator based on the negative sequence voltage signals generated by the negative sequence current regulator.

2. The rotary power generation system of claim 1, wherein the frequency dependent negative sequence gains comprise D-axis and Q-axis negative sequence gains, and wherein the negative sequence voltage signals are generated based on the determined D-axis and Q-axis negative sequence gains.

3. The rotary power generation system of claim 1, wherein the rotary power generator comprises a variable-speed wind turbine generator.

4. The rotary power generation system of claim 3, further comprising: a plurality of blades for rotating a shaft of the variable-speed wind turbine generator.

5. The rotary power generation system of claim 1, further comprising:
a generator convertor for receiving the variable-frequency alternating currents from the rotary power generator, wherein the voltage regulation system balances the variable-frequency alternating currents between the rotary power generator and the generator converter.

6. A variable-speed wind power generation system, comprising:
a variable-speed wind turbine generator for generating three-phase variable frequency alternating currents;
a negative sequence current regulator that determines and uses frequency dependent negative sequence gains based on an electrical frequency of the variable speed wind turbine generator,
wherein the negative sequence current regulator is further configured to:
obtain the electrical frequency of the variable-speed wind turbine generator;
determine the negative sequence gains from the set of frequency dependent negative sequence gains based on the obtained electrical frequency of the variable-speed wind turbine generator; and
generate negative sequence voltage signals based on the determined frequency dependent negative sequence gains; and
a system for controlling voltage components for balancing the three-phase variable-frequency alternating currents generated by the variable-speed wind turbine generator based on the frequency dependent negative sequence gains,
wherein the system for controlling voltage components is further configured to balance the variable-frequency alternating currents of the variable-speed wind turbine generator based on the negative sequence voltage signals generated by the negative sequence current regulator.

7. The variable-speed wind power generation system of claim 6, further comprising:
a generator convertor for receiving the variable-frequency alternating currents from the variable-speed wind turbine generator, wherein the voltage regulation system balances the variable-frequency alternating currents between the variable-speed wind turbine generator and the generator converter.

8. The variable-speed wind power generation system of claim 6, further comprising:
a plurality of blades for rotating a shaft of the variable-speed wind turbine generator.

9. The variable-speed wind power generation system of claim 8, wherein the electrical frequency of the variable-speed wind turbine generator is related to a speed of rotation of the shaft.

10. The variable-speed wind power generation system of claim 6 wherein the frequency-dependent negative sequence gains comprise D-axis and Q-axis negative sequence gains.

11. The variable-speed wind power generation system of claim 10, wherein the negative sequence voltage signals are generated based on the determined D-axis and Q-axis negative sequence gains.

12. A method for balancing generator currents, comprising:
obtaining an electrical frequency of a rotary power generator;
determining negative sequence gains from a set of frequency dependent negative sequence gains based on the obtained electrical frequency of the rotary power generator, wherein the frequency-dependent negative sequence gains include D-axis and Q-axis negative sequence gains;
generating negative sequence voltage signals based on the determined frequency dependent negative sequence gains; and
balancing variable-frequency alternating currents generated by the rotary power generator using the generated negative sequence voltage signals.

13. The method of claim 12, wherein the negative sequence voltage signals are generated based on the determined D-axis and Q-axis negative sequence gains.

* * * * *